(12) United States Patent
Jang et al.

(10) Patent No.: US 12,222,874 B2
(45) Date of Patent: Feb. 11, 2025

(54) SYSTEMS AND METHODS OF INTELLIGENT LOGICAL BLOCK ADDRESS (LBA) ACCESS TRACE LOG COLLECTION FOR PERFORMANCE OPTIMIZATION

(71) Applicant: DELL PRODUCTS L.P., Round Rock, TX (US)

(72) Inventors: Young Hwan Jang, Gyeonggi-do (KR); Min Thu Aung, Singapore (SG); Chai Im Teoh, Singapore (SG)

(73) Assignee: Dell Products L.P., Round Rock, TX (US)

( * ) Notice: Subject to any disclaimer, the term of this patent is extended or adjusted under 35 U.S.C. 154(b) by 147 days.

(21) Appl. No.: 17/860,029

(22) Filed: Jul. 7, 2022

(65) Prior Publication Data

US 2024/0012763 A1 Jan. 11, 2024

(51) Int. Cl.
*G06F 12/123* (2016.01)
*G06F 12/02* (2006.01)
*G06F 12/0815* (2016.01)

(52) U.S. Cl.
CPC ........ *G06F 12/123* (2013.01); *G06F 12/0246* (2013.01); *G06F 12/0815* (2013.01)

(58) Field of Classification Search
CPC . G06F 12/123; G06F 12/0246; G06F 12/0815
See application file for complete search history.

(56) References Cited

U.S. PATENT DOCUMENTS

| | | | |
|---|---|---|---|
| 8,239,618 B2 | 8/2012 | Kotzur et al. | |
| 8,266,354 B2 | 9/2012 | Farhan et al. | |
| 8,671,241 B2 | 3/2014 | Molloy | |
| 10,275,162 B2 | 4/2019 | Kan et al. | |
| 11,309,036 B1 | 4/2022 | Teoh et al. | |
| 2009/0113112 A1* | 4/2009 | Ye | G06F 12/0246 711/E12.007 |
| 2014/0281260 A1* | 9/2014 | Peterson | G06F 3/0679 711/135 |
| 2019/0065080 A1* | 2/2019 | Tanpairoj | G06F 12/0246 |
| 2019/0229901 A1* | 7/2019 | Elbaz | H04L 9/14 |
| 2019/0377498 A1* | 12/2019 | Das | G06F 3/0673 |
| 2020/0409856 A1* | 12/2020 | Navon | G06F 12/123 |

(Continued)

OTHER PUBLICATIONS

Dell, "SupportAssist for Business PCs", Obtained from Internet Sep. 2, 2021, 14 pgs.

(Continued)

*Primary Examiner* — Prasith Thammavong
(74) *Attorney, Agent, or Firm* — Egan, Enders & Huston LLP.

(57) ABSTRACT

Systems and methods are provided that may be implemented to collect and log (or record) data or information regarding logical block address (LBA) access activity occurring in a solid-state drive (SSD) non-volatile memory storage device of an information handling system. The LBA access activity may be collected, logged and store at the SSD storage controller-level, and may be retrieved and processed and/or analyzed to develop and then implement non-volatile memory management techniques to optimize and improve SSD device operation and performance (e.g., by decreasing read/write completion times), optimizing SSD media endurance (e.g., by extending the useful life of the SSD media), etc.

21 Claims, 5 Drawing Sheets

(56) References Cited

U.S. PATENT DOCUMENTS

2021/0225159 A1    7/2021  Grobelny
2022/0147259 A1*  5/2022  Thakur ................. G06F 3/0647

OTHER PUBLICATIONS

Intel, "NVM Express and the PCI Express SSD Revolution", May 4, 2012, 48 pgs.

Kirsch, "Intel SSD 66op 1TB Review With QLC NAND Flash—p. 6 of 9—Legit Reviews", Aug. 7, 2018, 8 pgs.

Wikipedia, "NVM Express", Obtained from Internet Jun. 27, 2022, 15 pgs.

Gillis et al., "NVMe (non-volatile memory express)", Obtained from Internet Jun. 27, 2022, 8 pgs.

Dell, "Resolve Hardware Issues With Integrated and Online Diagnostics", Obtained from Internet Jun. 23, 2021, 2 pgs.

Dell, "Using BIOSConnect to recover SupportAssist OS Recovery Partition", Obtained from Internet Apr. 9, 2020, 5 pgs.

* cited by examiner

| NVM Cmd | 41 |
|---|---|
| 502 | H |
| 504 OPC | Write |
| SQID | 0x0005 |
| CQID | 0x0005 |
| DATA | 128 dwords |
| MPTR | 00000000 00000000 |
| PRP1 | 00000002 2B7E57C0 |
| PRP2 | 00000000 00000000 |
| 506 SLBA | 00000000 00000000 |
| 508 NLB | 0x0000 |
| PRINFO | 0x0 |
| FUA | 0 |
| LR | 0 |
| DSM | |
| ACCF | No Frequency Information pr... |
| ACCL | None |
| SEQR | 0 |
| INCOOM | 0 |
| ILBRT | 0x0 |
| LBAT | 0x0 |
| LBATM | 0x0 |
| ST | |
| SC | Successful Completion |
| SCT | Generic Command Status |
| DEVICE ID | 006:00:0 |
| NSID | 0x00000001 |
| METRICS | |
| HNVME Tras | 5 |
| TIME DATA | 148.140 us |
| TIME STAMP | 0000 000 000 000 s |

→ 12 bit: *TLP Sequence Num* as timestamp indicator (Overflow to reset the counter)

→ 1 bit: Read/Write Indicator from *OPC Value*

→ 32 bit Addressing: 512Byte sector *64-bit LBA address value* converting to 4KB unit address

→ 3 bit: Multiple of 4KB up to 512KB. Any data size higher than 512KB equal to 512KB bit

FIG. 5

SYSTEMS AND METHODS OF INTELLIGENT LOGICAL BLOCK ADDRESS (LBA) ACCESS TRACE LOG COLLECTION FOR PERFORMANCE OPTIMIZATION

FIELD

This invention relates generally to non-volatile memory and, more particularly, to non-volatile memory for solid state drives (SSDs).

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems employ solid-state storage devices, (e.g., solid-state drives) to store data and programs of instructions for later retrieval. A solid-state drive (SSD) is a data storage device that uses non-volatile solid-state memory to store persistent data that is retained while the system is powered off. A SSD may emulate a hard disk drive interface to easily replace a hard disk drive, and SSDs often use NAND flash memory as an underlying storage medium. A page is the smallest NAND unit which may be written, and a traditional single-level cell (SLC) NAND media stores one bit per cell. However, NAND memory has been scaled up in density by putting more bits in a single cell. Examples of denser types of NAND media include what is commonly referred to as multi-level cell (MLC) memory having two bits per cell, triple-level cell (TLC) memory having three bits per cell, and quad-level cell (QLC) memory having four bits per cell.

As the NAND industry scales up its raw capacity by storing more bits into a single cell, the performance of NAND memory storing multi bits suffers lower performance as a trade-off. In an attempt to compensate for this lower performance, some current SSD designs incorporate a feature that converts a certain ratio of lower cost multibit cell NAND (QLC) into faster performance cell NAND (SLC) as a performance cache. However, there is complexity in such designs as the size of QLC space has to dynamically change depending on the user data occupancy, and subsequently the data in SLC space also needs to migrate as the availability of QLC space changes. Current policies and algorithms for this space allocation and data migration is purely based on Most Recently Used (MRU) and First In First Out (FIFO). It is not possible to use common caching algorithms (e.g., such Least Recently Used (LRU), Least Frequently-Used (LFU), etc.) due to resource limitations inside conventional SSD controllers.

In an existing method, logical block address (LBA) access data measurement and collection is performed by an application running on the operating system (OS) of an information handling system, and is retrieved as a large-sized OS application-level data log on the host CPU of the information handling system. Due to privacy concerns, LBA access data is measured and the OS application-level data log is retrieved only upon agreement and consent of the information handling system user, and the retrieved OS application-level data log is stored in the same user data-storing space on the storage device. Besides requiring advance consent and agreement from the system user, this LBA access data collection technique potentially causes delay in the information handling system user experience when the large OS application-level data log is cumulated to its threshold to flush it into the user data storing space on the storage device.

SUMMARY

Disclosed herein are systems and methods that may be implemented in one embodiment to collect and log (or record) data or information regarding logical block address (LBA) access activity occurring in a solid-state drive (SSD) non-volatile memory storage device of an information handling system, such as notebook computer, desktop or tower computer, tablet or convertible computer, computer server system, computer workstation etc. Examples of types of such LBA access activity data that may be collected and recorded or logged include, but are not limited to, LBA access frequency, time-stamp, identity of a type of command (e.g., either a read or a write command) associated with each LBA access, LBA and Offset for data size information of each LBA access, etc. This collected LBA access activity data may be processed and/or analyzed to develop and then implement non-volatile memory management techniques to optimize and improve SSD device operation and performance (e.g., by decreasing read/write completion times), optimizing SSD media endurance (e.g., by extending the useful life of the SSD media), etc.

In one embodiment of the disclosed systems and methods, LBA access activity may be collected and logged (and stored) at the SSD storage controller-level in compact or compressed form rather than at the OS application-level, thus eliminating delays in information handling system performance that may be experienced by a user during conventional LBA access data measurement performed by an OS application running on the OS of the information handling system. In one embodiment, LBA access activity data (i.e., that does not include any personal user data such as personally-identifiable system user data, etc.) may be so collected and logged at the SSD storage controller-level and saved in compressed form on non-user data storage area SSD storage media, thus preserving the user's storage access (e.g., read/write) behavior while at the same time preventing any exposure of personally-identifiable system user data or other personal data and eliminating any need for advance consent and agreement from the system user for the LBA access activity data collection. The LBA access activity data may be held stored in non-user data storage area SSD storage media until later retrieval from the SSD storage media and transmittal to a cloud (e.g., remote) database, e.g., by an application running on a host programmable integrated circuit of the information handling system.

Moreover, the disclosed systems and methods may be implemented to collect and compact the log size of the LBA access activity for a given information handling system, e.g., to generate a compact log of refined LBA access activity data that may be further processed and/or added to a database (e.g., such as an original equipment manufacturer "OEM" cloud database) that also contains similarly refined LBA access activity data collected and logged by the SSD devices of multiple different other information handling systems. In one embodiment, the refined compact LBA access activity data of a given information handling system and/or the combined refined compact LBA access activity data of multiple information handling systems may be further analyzed to determine user access patterns of host data on an SSD device to determine user access patterns, and to develop algorithms and/or other management techniques based on the determined user access patterns to program firmware and/or a programmable integrated circuit of a SSD storage controller to intelligently manage data migration and improve operation of the SSD device by storing frequently-accessed blocks together in identified locations within non-volatile memory of an SSD that increase SSD read/write speed performance and/or increase SSD storage media endurance by extending the useful life of NAND flash or other SSD non-volatile memory media in a way that postpones the wear out point of SSD non-volatile memory.

In one respect, disclosed herein is a method, including receiving command packets in a solid-state drive (SSD) storage device of a local information handling system; and performing the following at the SSD storage device level: extracting designated attributes from each of the command packets as logical block access (LBA) access activity data; analyzing the extracted LBA access activity data; and controlling at least one of data storage location and/or migration of data within a non-volatile storage media of the SSD storage device of the local information handling system based at least in part on the analyzed extracted LBA access activity data.

In another respect, disclosed herein is a method, including receiving command packets in a solid-state drive (SSD) storage device of a local information handling system; and performing the following at the SSD storage device level: extracting designated attributes from each of the command packets as logical block access (LBA) access activity data; temporarily storing the extracted LBA access activity data in a memory of the SSD storage device; and then providing the extracted LBA access activity data across a network from the local information handling system to a remote server.

In another respect, In another respect, disclosed herein is a system including a local information handling system, the local information handing system including: a host programmable integrated circuit coupled to a network; and a solid-state drive (SSD) storage device coupled to the host programmable integrated circuit; where the SSD storage device receives command packets from the host programmable integrated circuit. The SSD storage device may include at least one programmable integrated circuit programmed to perform the following at the SSD storage device level: extracting designated attributes from each of the command packets as logical block access (LBA) access activity data, temporarily storing the extracted LBA access activity data in a memory of the SSD storage device, and then providing the extracted LBA access activity data to the host programmable integrated circuit; where the host programmable integrated circuit is programmed to provide the extracted LBA access activity data across a network from the local information handling system to a remote server.

BRIEF DESCRIPTION OF THE DRAWINGS

FIG. 5 illustrates a portion of a transaction layer command packet according to one exemplary embodiment of the disclosed systems and methods.

DESCRIPTION OF ILLUSTRATIVE EMBODIMENTS

Figure 1:
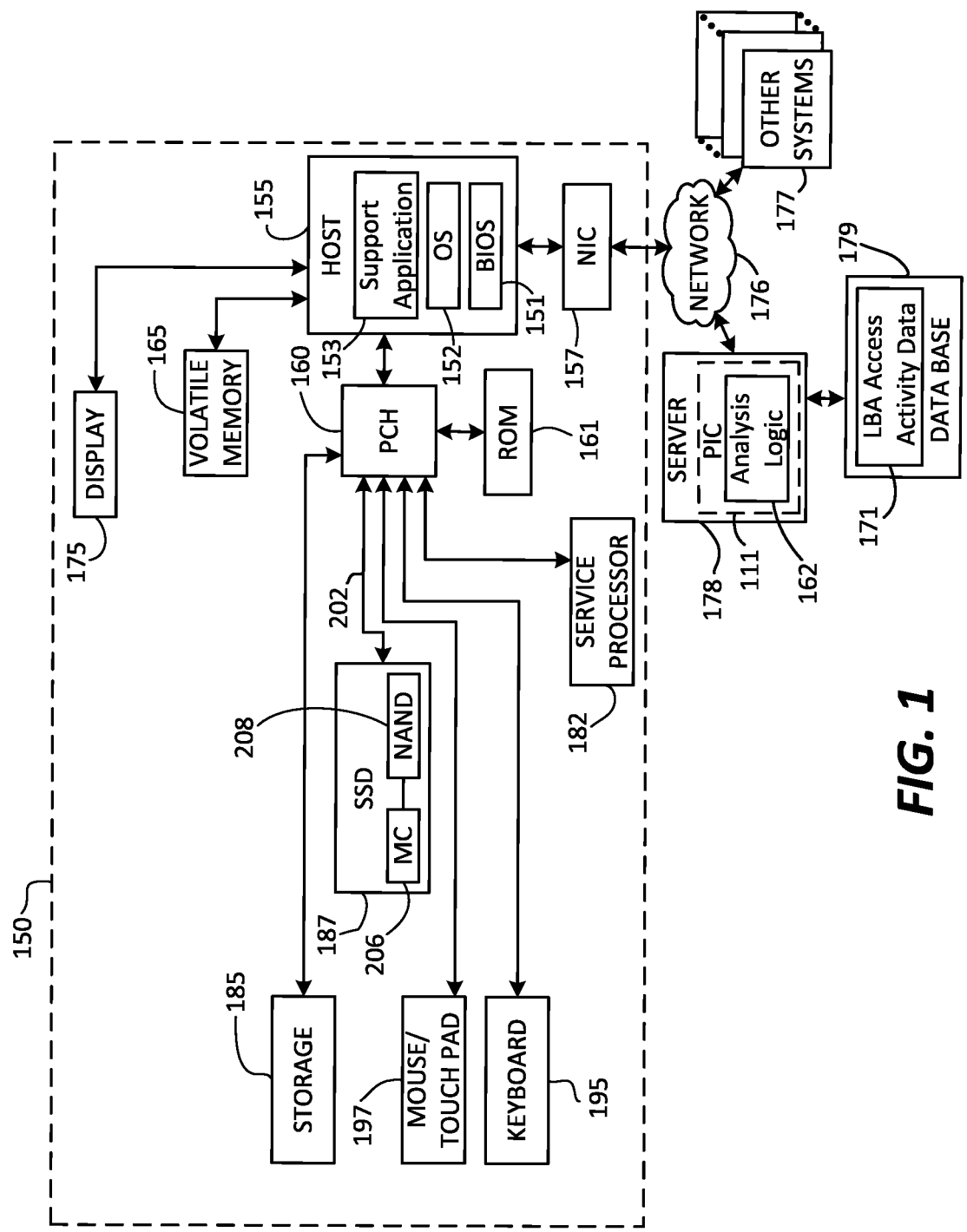
FIG. 1 illustrates a block diagram of an information handling system according to one exemplary embodiment of the disclosed systems and methods.

FIG. 1 is a block diagram of one embodiment of a local information handling system 150 with which the disclosed systems and methods may be implemented to collect and log logical block address (LBA) access activity data for a solid-state drive (SSD) storage device of an information handling system. Local information handling system 150 of FIG. 1 may be a computer server system, notebook computer system, convertible computer system, desktop computer system, computer workstation, etc. It will be understood that the system configuration of FIG. 1 is exemplary only, and that the disclosed systems and methods may be implemented for other types of NAND devices and/or other configurations and/or types of information handling system configuration including, but not limited to, cell phones or smart phones, tablet computers, set-top boxes, etc.

As shown in FIG. 1, local information handling system 150 of this exemplary embodiment includes at least one host programmable integrated circuit 155, which may be a central processing unit CPU (e.g., such as an Intel Pentium series processor, an Advanced Micro Devices (AMD) processor, etc.) or one of many other processors or other types of suitable processing devices configured to interpret and/or execute program instructions and/or process data. In some embodiments, programmable integrated circuit 155 may interpret and/or execute program instructions and/or process data stored in system volatile memory 165, SSD 187, optional additional storage media 185 and/or another component of local information handling system 150. System-powered volatile memory 165 (e.g., dynamic random access memory DRAM) may be coupled as shown to host programmable integrated circuit 155 via platform controller hub (PCH) 160 which facilitates input/output functions for the information handling system. In the embodiment of FIG. 1, host programmable integrated circuit 155 executes, among other things, system basic input/output system (BIOS) 151, operating system (e.g., Microsoft Windows-based operating system, Linux-based operating system, etc.) 152, and support application 153 (e.g., support assist agent such as Dell SupportAssist agent available from Dell Technologies Inc. of Round Rock, Texas).

System read-only memory (ROM) 161 (e.g., such as erasable programmable read only memory "EPROM", electrically erasable programmable read only memory "EEPROM", etc.) may also be provided as shown for storing start up firmware, such as BIOS 151. Also shown coupled to host programmable integrated circuit 155 is network interface card (NIC) 157 that is provided to enable communication across network 176 (e.g., such as the Internet or local corporate intranet) with other information handling systems 177 and remote cloud server information handling system 178 (e.g., which accesses cloud database 179 that stores LBA access activity data retrieved from local information handling system 150 and the other information handling systems 177). It will be understood that remote cloud server information handling system 178 and other information handling systems 177 may be configured in one embodiment with one or more similar components (e.g., programmable integrated circuits, system memory, system storage, network interface, etc.) and/or similar system architecture as local information handling system 150, and that server information handling system 178 may include at least one programmable integrated circuit 111 programmed to execute analysis logic 162 and any other remote server actions that are described elsewhere herein.

Still referring to FIG. 1, SSD 187 may be an internal or external drive coupled to PCH 160, and includes main storage NAND Flash memory 208 and a SSD memory controller (MC) 206 to provide storage for the information handling system. As shown, optional additional storage 185 (e.g., hard drive, optical drive, etc.) may also be optionally coupled to PCH 160 to provide additional non-volatile storage for local information handling system 150. One or more input devices (e.g., keyboard 195, mouse/touchpad 197, etc.) may be optionally coupled to PCH 160 and its controller chip to enable a system user to interact with the information handling system 150 and application programs or other software/firmware executing thereon. A display device 175 (e.g., LED display, touchscreen display, etc.) may be coupled as shown to an integrated graphics processing unit (iGPU) of host programmable integrated circuit 155 for display of information to a system user.

As further shown in this embodiment, the exemplary local information handling system 150 of this embodiment may also include an optional service processor 182 suitable for the given configuration of information handling system 150 (e.g., such as embedded controller, baseboard management controller "BMC", etc.) and that is coupled to PCH 160 and its integrated controller chip as shown. It will be understood that the particular combination of local information handling system components of FIG. 1 is exemplary only, and that the disclosed systems and methods may be implemented with an information handling system that includes any other suitable combination of additional, fewer or alternative information handling system components (e.g., including one or more programmable integrated circuits).

In the embodiment of FIG. 1, PCH 160 may be coupled to other components with optional interfaces such as a PCIe interface and device interfaces such as a USB (Universal Serial Bus) interface, for example. As previously mentioned, it will be understood that SSD 187 may be configured as an integral component within a chassis of local information handling system 150 (e.g., internal SSD), or may be alternatively configured as an attached external storage device.

Figure 2:
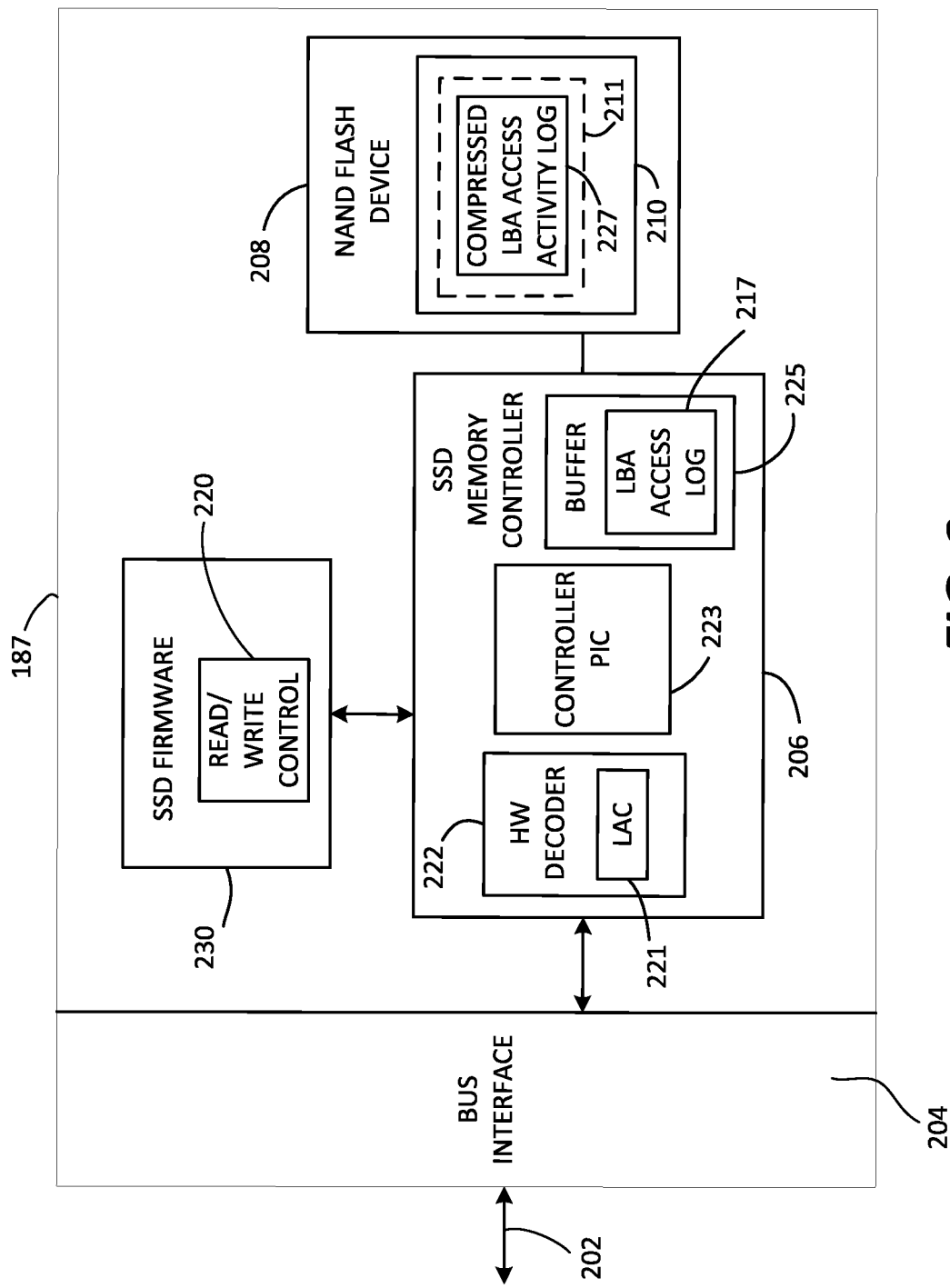
FIG. 2 illustrates a block diagram of a solid state drive (SSD) according to one exemplary embodiment of the disclosed systems and methods.

FIG. 2 illustrates a block diagram of one exemplary embodiment of SSD 187 that stores information or data for local information handling system 150. In the embodiment of FIG. 2, SSD 187 includes main storage NAND flash non-volatile memory device 208, e.g., that includes multiple NAND blocks to which data is written to and read back by host programmable integrated circuit 155 across data bus 202 (e.g., high speed PCIe 3.0 bus or other suitable data bus such as serial advanced technology attachment "SATA", serial attached SCSI "SAS", etc.) via bus interface 204. As shown, a SSD flash memory controller 206 may include a programmable integrated circuit (PIC) 223 (e.g., any suitable one or more programmable integrated circuits such as microprocessors, microcontrollers, ASICs, FPGAs, etc.) that is coupled to controller memory 230 (e.g., non-volatile flash memory) that stores firmware that includes read/write control logic 220 that may be used by controller 206 to control reads to and writes from the NAND blocks 210 of main storage NAND flash memory device 208. In one embodiment, programmable integrated circuit 223 of controller 206 may reference a mapping table of read/write control logic 220 in performing reads and writes in order to translate virtual logical block addresses (LBAs) of SSD 187 (as "seen" by host programmable integrated circuit 155) to physical block addresses of NAND blocks 210 of main storage NAND flash memory device 208.

Still referring to FIG. 2, in this embodiment, SSD flash memory controller 206 also includes a hardware (HW) decoder 222 (e.g., microcontroller or Application Specific Integrated Circuit "ASIC", etc.) that in this embodiment implements LBA activity collection (LAC) logic 221 that may be used in coordination with programmable integrated circuit 223 (e.g., microcontroller or ASIC, etc.) of controller 206 to collect and record LBA access activity data within a LBA access activity log 211 (e.g., such as a trace log) maintained in main storage NAND memory device 208 in a manner as descried further herein. In an alternative embodiment, a software or firmware decoder executed by controller programmable integrated circuit 223 may instead be employed to perform the tasks of hardware decoder 222 described herein.

Further information on possible components and operation of local information handling system 150 and/or NAND flash memory device 187 may be found in U.S. Pat. Nos. 8,239,618; 8,671,241; 8,266,354; 10,275,162; and 11,309,036, each of which is incorporated herein by reference in its entirety for all purposes.

Figure 3:
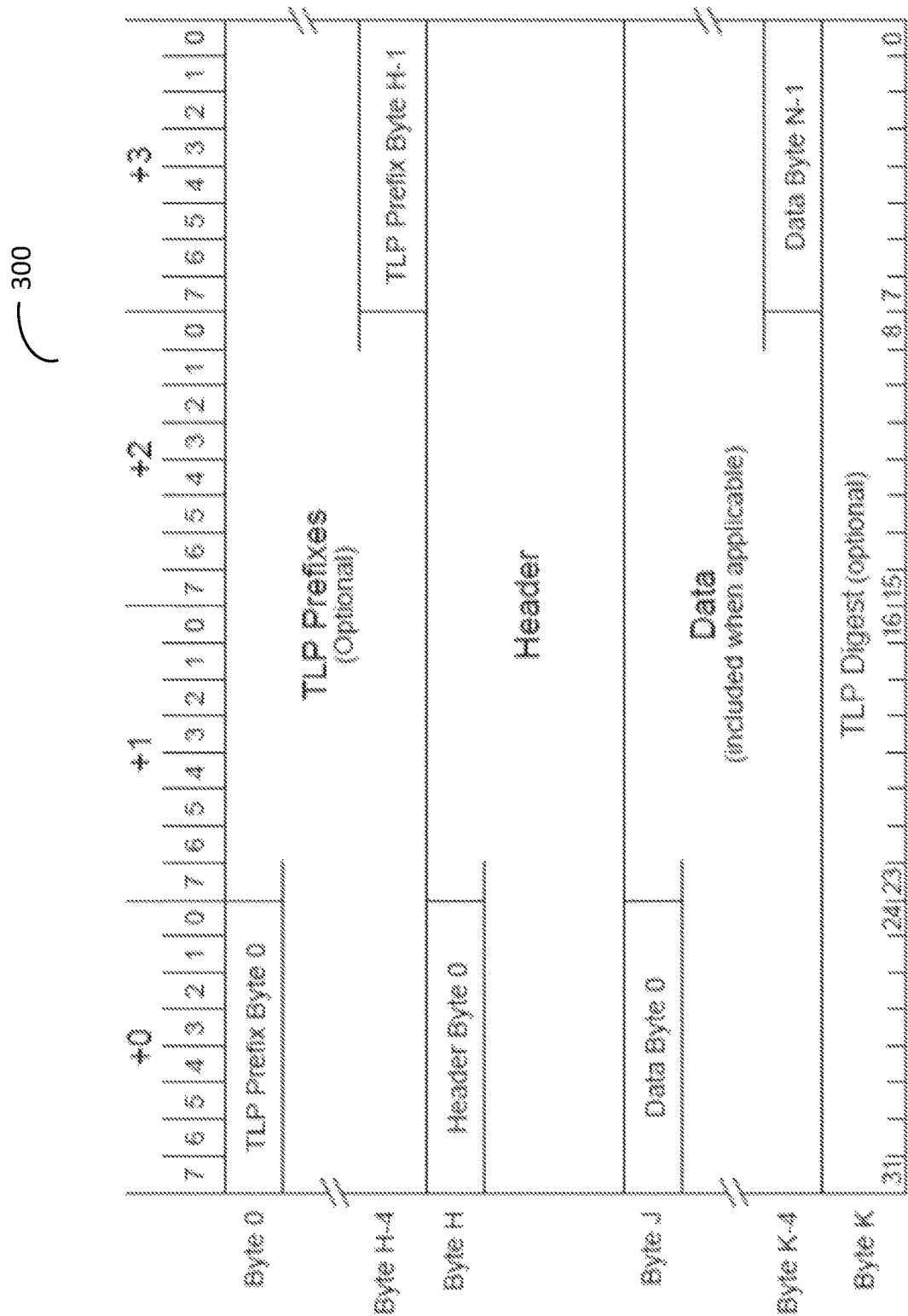
FIG. 3 illustrates a transaction layer command packet according to one exemplary embodiment of the disclosed systems and methods.

FIG. 3 illustrates a high level view of a transaction layer command packet (TLP/NVMe) 300 of a non-volatile memory express (NVMe) host controller interface and storage protocol that may be used to communicate read and write commands (e.g., including storage locations where specified read/write data is stored in NAND blocks 210 of main storage NAND flash memory device 208) from host programmable integrated circuit 155 to SSD 187 across data bus 202 (e.g., high speed PCIe 3.0 bus). As shown in FIG. 3, each TLP/NVMe command packet 300 includes TLP prefixes that may be extracted by LBA activity collection (LAC) logic 221 of hardware decoder 222 of SSD 187 in order to collect data such as time-stamp of the packet, identity of the type of command designated by the packet (e.g., read or write command), logical block address (LBA) designated by the packet, Offset for data size information to be read or written in response to the packet, etc. As shown, TLP/NVMe command packet 300 may also include data when applicable, e.g., in the case where TLP/NVMe command packet 300 is transmitted as a write command to SSD 187 from programmable integrated circuit 155.

Figure 4:
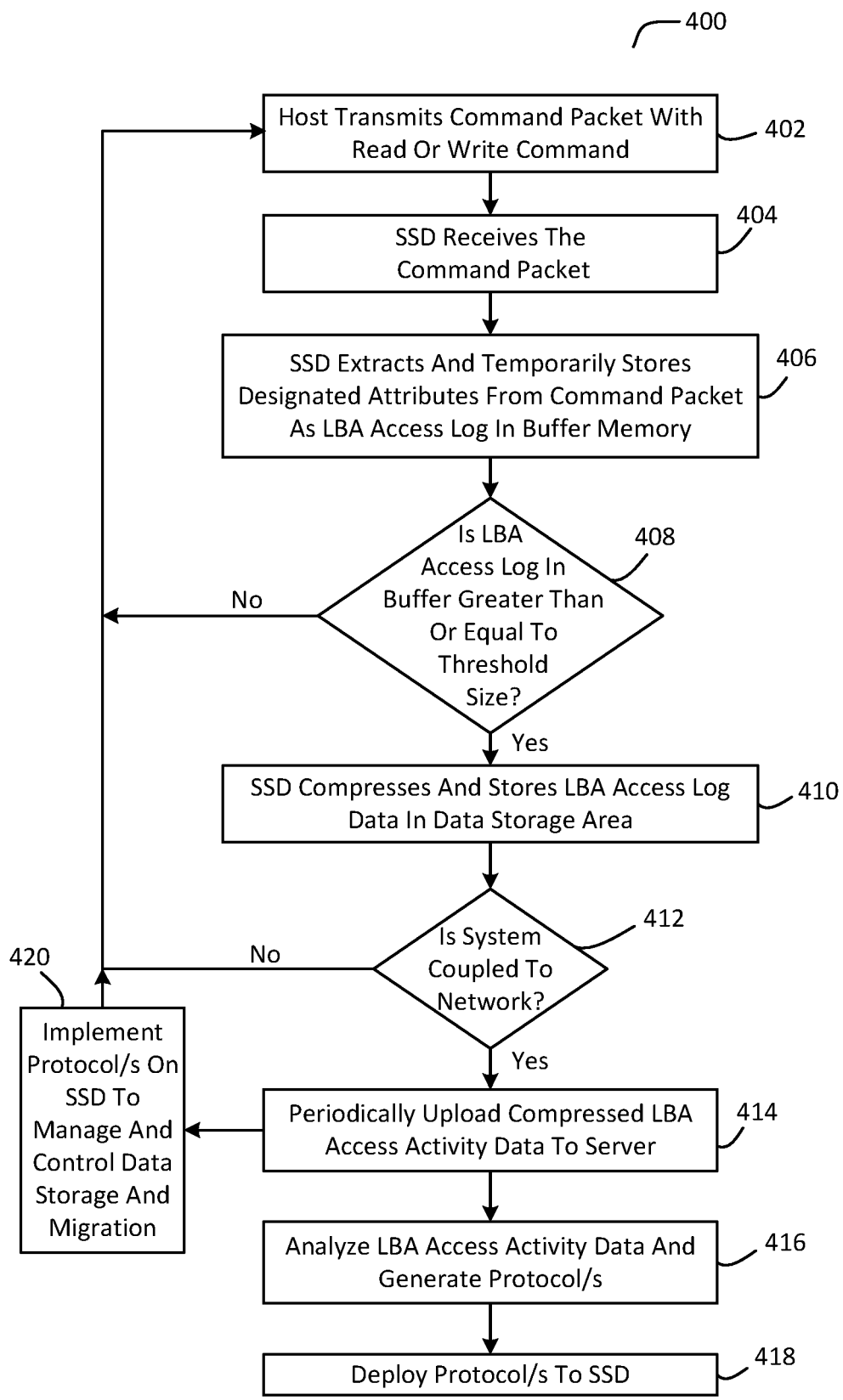
FIG. 4 illustrates methodology according to one exemplary embodiment of the disclosed systems and methods.

FIG. 4 illustrates one exemplary embodiment of a methodology 400 that may be implemented to collect and log LBA access activity data from read and write operations performed by SSD 187, and to manage and/or control data storage and data migration between locations in non-volatile memory of SSD 187 based at least in part on this collected LBA access activity data. Methodology 400 begins in block 402 where host programmable integrated circuit 155 transmits a read or write command (with its associated TLP/NVMe command packet 300) across data bus 202 to SSD 187. In block 404, hardware decoder 222 of SSD 187 receives the transmitted transaction layer packet (TLP/NVMe) 300 across data bus 202 from host programmable integrated circuit 155. Next, in block 406, LAC logic 221 of hardware decoder 222 detects, extracts and collects one or more designated types of command packet values or attributes (e.g., time-stamp of the packet, identity of a type of command (e.g., either read or write) transmitted by the packet, logical block address (LBA) designated by the packet, Offset for data size information to be read or written in response to the packet, etc.) from the TLP prefixes of TLP/NVMe 300 and temporarily stores these values or attributes as LBA access activity data in buffer memory 225 of SSD controller 206 to generate (or increment) a unique concise LBA access log 217 in buffer 225.

In one embodiment of block 404, LAC logic 221 of hardware decoder 222 extracts and collects command packet data only from the TLP prefixes of TLP/NVMe command packet 300 and does not extract or collect any other data (including user data) from TLP/NVMe command packet 300. Since the collected command packet data of this LBA access log 217 does not include any user data associated with the system user of information handling system 100, it therefore does not include any user personal data and does not implicate user privacy concerns. At the same time, unique characteristics of the collected command packet data of this LBA access log 217 preserves the system user's read/write behavior to SSD 187 of the information handling system 100, with negligible or no impact on the performance of SSD 187.

Table 1 below is an example of a portion (e.g., the first 15 entries) of such a unique LBA access log 217, it being understood that a LBA access log may have any other configuration and/or form that is suitable for storing command packet values extracted from the TLP prefixes of TLP/NVMe 300.

TABLE 1

| Log Entry Number | Logged Command Packet Values |
| --- | --- |
| 1 | 205.134.224.134 |
| 2 | 205.134.224.134 |
| 3 | 205.134.224.134 |
| 4 | 205.134.224.134 |
| 5 | 205.134.224.134 |
| 6 | 205.134.224.134 |
| 7 | 180.76.5.100 |
| 8 | 205.134.224.134 |
| 9 | 205.134.224.134 |
| 10 | 174.77.92.170 |
| 11 | 205.134.224.134 |
| 12 | 174.77.92.170 |
| 13 | 174.77.92.170 |
| 14 | 174.77.92.170 |
| 15 | 174.77.92.170 |
| ... | ... |

Sill referring to FIG. 4, methodology 400 next proceeds to block 408, where LAC logic 221 of hardware decoder 222 determines if the size of the LBA access log 217 has reached a predefined threshold size within the buffer memory 225. If the size of the LBA access log 217 is found not to have reached the predefined maximum threshold size in block 408, then methodology 400 returns to block 402 and repeats. However, if the size of the LBA access log 217 is found to have reached the predefined maximum threshold size in block 408, then methodology 400 proceeds to block 410, where LAC logic 221 of hardware decoder 222 compacts or compresses the data of LBA access log 217 to minimize the data transfer size of the LBA access log (e.g., such as by 80% compression factor or a greater or lesser compression factor), and then stores the data of this compressed LBA access log 227 within a non-user data storage area such as SSD boot partition or overprovisioned area 211 of SSD NAND 210. As so stored, the user of information handling system does not have access to the data of the compressed LBA access log 227 in the SSD boot partition or overprovisioned area 211 of SSD NAND 210. In block 410, any suitable compression algorithm may be employed. Examples of suitable compression algorithms that may be employed in block 410 include, but are not limited to, compression algorithms such as predicion by partial matching (PPM), run-length encoding (RLE), etc.

Next, in block 412, support application 153 executing on host programmable integrated circuit 155 determines whether information handling system 100 is coupled to communicate with cloud server 178 (e.g., a remote server information handling system) across network 176. If not, then methodology 400 then returns to block 402 and repeats. However, if information handling system 100 is found in block 412 to be coupled to communicate with cloud server 178 across network 176, then methodology 400 proceeds to block 414 where support application 153 executes on host programmable integrated circuit 155 to retrieve the compressed data of LBA access log 227 from SSD boot partition or overprovisioned area 211 of SSD NAND 210, and periodically uploads this compressed data to cloud server 178. Cloud server 178 then stores the LBA access activity data 171 of the uploaded compressed LBA access activity log 227 on designated cloud database 179, and methodology 400 then returns to block 402 and repeats. In one embodiment, a programmable integrated circuit of cloud server 178 may also decompress the compressed data of compressed LBA access activity log 227, e.g., before storing it as decompressed LBA access activity data 171 on designated cloud database 179 in block 414 or after retrieving it as compressed LBA access activity data 171 from designated cloud database 179 and before analyzing it as decompressed LBA access activity data 171 in block 416 described below.

As further shown in block 416 of FIG. 4, the stored LBA access activity data 171 from LBA access log/s on cloud database 179 may also be retrieved and analyzed (e.g., while blocks 402 to 414 continue to independently and iteratively repeat) to develop memory media management techniques (i.e., protocols or other procedures) for SSD 187. In one exemplary embodiment, intelligent memory media management protocol/s or other procedure/s (e.g., algorithm/s to be executed by firmware and/or programmable integrated circuit 223 of SSD controller 206) may be developed from analysis of this stored LBA access activity data (e.g., using analysis logic 162 executing on server 178 to implement machine learning or other analysis technique/s such as statistical analysis tools) for controlling data migration between relatively less dense single-level cell (SLC) NAND storage media 210 of SSD 187 and other relatively more dense (or denser) types of NAND storage media 210 of the same SSD 187 (e.g., such as multi-level cell "MLC" memory having two bits per cell, triple-level cell "TLC" memory having three bits per cell, and/or quad-level cell "QLC" memory having four bits per cell). These memory management protocol/s or other procedure/s may then be deployed in block 418 as part of firmware of read/write control logic 220 of SSD 187, and implemented in block 420 by programmable integrated circuit 223 of SSD controller 206 to control data storage locations and/or data migration between SLC NAND media 210 and one or more other denser types of NAND media 210 (e.g., MLC, TLC, QLC, etc.) of the same SSD 187.

As a non-limiting example, protocol/s or other procedure/s of block 416 for managing and controlling data storage and data migration between locations in SLC memory and QLC memory on NAND media 210 of SSD 187 may be based on observed historical user access patterns to particular identified blocks of data (e.g., such as user access pattern/s to most frequently-accessed or most frequently-used (MFU) memory blocks, user access pattern/s to least frequently-accessed or least frequently-used (LFU) memory blocks, etc.) within NAND 210 of SSD 187 that are determined from the LBA access activity of the LBA access log stored on cloud database 179. These protocol/s or other procedure/s of block 416 may be deployed in one embodiment as part of firmware of read/write control logic 220 in block 418 and executed in block 420 by programmable integrated circuit 223 of SSD controller 206 to improve operation of the SSD device by intelligently controlling (i.e., prioritizing and performing) the storage of data of identified particular most frequently-accessed or used (or MFU) memory blocks in memory blocks located together with each other (e.g., next to or adjacent to each other) in respective identified locations (e.g., SLC memory locations) within non-volatile NAND memory 210 of SSD 187 in order to increase read/write speed performance of SSD 187, and/or by limiting or preventing data migration (e.g., from SLC to QLC or other denser memory space/s) of such identified particular frequently-accessed (or MFU) memory blocks in order to increase the endurance and the useful life of NAND media 210 of SSD 187 by postponing the wear out point of NAND media 210 of SSD 187.

As a further non-limiting example, protocol/s or other procedure/s of block 416 may be additionally or alternatively deployed as part of firmware of read/write control logic 220 in block 418 and executed in block 420 by programmable integrated circuit 223 of SSD controller 206, for example, to prioritize and perform storage of data of identified particular least frequently-accessed (or LFU) memory blocks in memory blocks located apart from each other in respective identified locations (e.g., in QLC or other memory space/s denser than SLC) within non-volatile NAND memory 210 of SSD 187, and/or to prioritize and perform data migration (e.g., from SLC to QLC or other denser memory space/s) of such identified particular least frequently-accessed or used (or LFU) memory blocks, e.g., so as to allow further prioritization and use of adjacent storage and non-migration for more frequently-accessed or used (or LFU) memory blocks of NAND memory 210 of SSD 187.

It will be understood that the steps of methodology 400 of FIG. 4 described herein are exemplary only, and that any other sequence or combination of additional, fewer and/or alternative steps may be employed that is suitable for collecting and logging LBA access activity data from read and write operations performed by SSD 187, and for managing and/or controlling data storage and data migration between locations in non-volatile memory of SSD 187 based at least in part on this collected and logged LBA access activity data in a manner as described herein.

FIG. 5 illustrates a more detailed view of one embodiment of information of an exemplary 48-bit TLP/NVMe command packet 500 as it may be generated by OS 152 executing on information handling system 100, and then transmitted from OS 152 via communication data bus 202 to SSD 187 to command SSD 187 to read or write data. In this embodiment, 48-bit TLP/NVMe command packet 500 may be used (e.g., in the embodiment of FIG. 4) by hardware decoder 222 to generate an LBA access log from a Dword NVMme command packet and its TLP Header. In the exemplary embodiment of FIG. 5, the 48-bit TLP/NVMe command packet 500 may be converted as follows by LAC logic 221 of hardware decoder 222 of SSD 187 to the following four entries of the LBA access log from the field attributes of TLP/NVMe command packet 500 that are identified by the arrows in FIG. 5. In this exemplary embodiment, the total size of the created LBA access log from this TLP/NVMe command packet 500 is 48 bits (i.e., total size of the 12 bit+1 bit+32 bit+3 bit entries below), it being understood that larger and smaller sized LBA access logs are possible and/or that fewer or additional LBA access log entries may be created from corresponding fewer or additional entries of a TLP/NVMe command packet.

12 bit size entry 502: The TLP Sequence Num is a 12 bit information sequence counter field which acts as time-stamp indicator of the LBA access log created by hardware decoder 222, and it may overflow to reset the counter.

1 bit size entry 504: The OPC is a 1 bit field for indicating either a Write or Read command specified by the packet 500, and may be converted by the hardware decoder 222 to a 1 bit information for the LBA access log.

32 bit size entry 506: The SLBA (Starting LBA) field has a 512 Byte sector 64-bit LBA address value that is converted by hardware decoder 222 to 32 bit addressing by unifying 4 sectors into 4 KB 1-sector unit address (i.e., goes up to 16 TB), and LBA 0 may be aligned to the first physical 4 k block 32 Alignment 0. This field indicates how much information is stored by 64 bit standard (e.g., rewritten by hardware decoder 222 to a 32 bit size to reduce storage space of the LBA access log.

3 bit size entry 508: The NLB (Number of Logical Block) field indicates the number of logical blocks to be written or read, and this field may be converted by hardware decoder 222 to 3 bit information in the LBA access log (e.g., where the starting value is 4 KB and goes by multiple of 4 KB up to 512 KB with any data size larger than 512 KB equal to max bit value).

It will be understood that one or more of the tasks, functions, or methodologies described herein for an information handling system or component thereof (e.g., including those described herein for components 111, 151, 152, 153, 155, 162, 175, 177, 178, 179, 182, 206, 220, 221, 222, 223, 230, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed on a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such programmable integrated circuits may be selected from the group consisting of CPU, controller, microcontroller, microprocessor, FPGA, CPLD and ASIC. The computer program of instructions may include an ordered listing of executable instructions for implementing logical functions in an information handling system or component thereof. The executable instructions may include a plurality of code segments operable to instruct components of an information handling system to perform the methodologies disclosed herein. It will also be understood that one or more steps of the present methodologies may be employed in one or more code segments of the computer program. For example, a code segment executed by the information handling system may include one or more steps of the disclosed methodologies. It will be understood that a programmable integrated circuit may be configured to execute or otherwise be programmed with software, firmware, logic, and/or other program instructions stored in one or more non-transitory tangible computer-readable mediums (e.g., example, data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random update memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method, comprising receiving command packets in a solid-state drive (SSD) storage device of a local information handling system, the SSD storage device of the local information handling system comprising a memory controller, a main storage non-volatile memory that stores user data, and a separate controller memory that stores read/write control logic for the memory controller; and performing the following at the SSD storage device level:
   extracting designated attributes from each of the command packets as logical block access (LBA) access activity data that is different from the user data stored on the SSD storage device of the local information handling system;
   temporarily storing the extracted LBA access activity data in a non-user data storage area that is a boot partition or overprovisioned area memory of the SSD storage device; and
   then providing the extracted LBA access activity data across a network to a remote server from the non-user data storage area of the SSD storage device of the local information handling system.

2. The method of claim 1, where the command packets comprise read and write commands received from a host programmable integrated circuit of the local information handling system; and where the designated attributes of the command packets comprise at least one of a time-stamp of each command packet, an identity of a type of command designated by each command packet, a logical block address (LBA) designated by each command packet, or a data size information to be read or written in response to the packet.

3. The method of claim 1, further comprising compressing the extracted LBA access activity data before the providing of the extracted LBA access activity data as compressed extracted LBA access activity data across the network from the local information handling system to the remote server.

4. The method of claim 1, where no attributes are extracted from the command packets at an operating system (OS) or an application level of the local information handling system; and where the extracted LBA access activity data includes no user personal data.

5. The method of claim 1, further comprising:
   analyzing the extracted LBA access activity data provided across the network to the remote server from the local information handling system; and
   controlling at least one of data storage location and/or migration of data within a non-volatile storage media of the SSD storage device of the local information handling system based at least in part on the analyzed extracted LBA access activity data.

6. The method of claim 5, further comprising:
   generating at least one memory management procedure based at least in part on the extracted LBA access activity data provided to the remote server across the network from the local information handling system;
   deploying the at least one memory management procedure across the network to the local information handling system;
   storing the at least one memory management procedure as a computer readable code in a non-transitory tangible controller memory of the SSD storage device of the local information handling system; and
   executing the computer readable code of the stored memory management procedure on at least one programmable integrated circuit of the SSD storage device to control at least one of data storage location or data migration on the non-volatile storage media of the SSD storage device.

7. The method of claim 6, where the generating the at least one memory management procedure based at least in part on the extracted LBA access activity data provided to the remote server across the network from the local information handling system comprises generating the at least one memory management procedure based at least in part on observed historical user access patterns to particular identified blocks of data within the non-volatile storage media of the SSD storage device that are determined from the extracted LBA access activity data.

8. The method of claim 7, where the executing the computer readable code of the stored memory management procedure on the at least one programmable integrated circuit of the SSD storage device comprises executing the computer readable code of the stored memory management procedure on the at least one programmable integrated circuit of the SSD storage device to control data migration on the non-volatile storage media of the SSD storage device between a relatively less dense type of the non-volatile storage media of the SSD storage device and a relatively more dense type of the non-volatile storage media of the SSD storage device.

9. The method of claim 1, further comprising first storing the LBA access activity data in a buffer memory of the memory controller before temporarily storing the extracted LBA access activity data in the non-user data storage area that is the boot partition or overprovisioned area memory of the SSD storage device.

10. A method, comprising receiving command packets in a solid-state drive (SSD) storage device of a local information handling system; and performing the following at the SSD storage device level:
  extracting designated attributes from each of the command packets as logical block access (LBA) access activity data;
  temporarily storing the extracted LBA access activity data in a memory of the SSD storage device; and
  then providing the extracted LBA access activity data across a network from the local information handling system to a remote server;
  where the method further comprises:
    analyzing the extracted LBA access activity data provided across the network to the remote server from the local information handling system, and
    controlling at least one of data storage location and/or migration of data within a non-volatile storage media of the SSD storage device of the local information handling system based at least in part on the analyzed extracted LBA access activity data;
  where the method further comprises:
    generating at least one memory management procedure based at least in part on the extracted LBA access activity data provided to the remote server across the network from the local information handling system;
    deploying the at least one memory management procedure across the network to the local information handling system;
    storing the at least one memory management procedure as a computer readable code in a non-transitory tangible controller memory of the SSD storage device of the local information handling system; and
    executing the computer readable code of the stored memory management procedure on at least one programmable integrated circuit of the SSD storage device to control at least one of data storage location or data migration on the non-volatile storage media of the SSD storage device;
  where the generating the at least one memory management procedure based at least in part on the extracted LBA access activity data provided to the remote server across the network from the local information handling system comprises generating the at least one memory management procedure based at least in part on observed historical user access patterns to particular identified blocks of data within the non-volatile storage media of the SSD storage device that are determined from the extracted LBA access activity data; and
where the executing the computer readable code of the stored memory management procedure on the at least one programmable integrated circuit of the SSD storage device comprises executing the computer readable code of the stored memory management procedure on the at least one programmable integrated circuit of the SSD storage device to at least one of limit or prevent migration of data of identified particular most frequently-used (MFU) memory blocks from a relatively less dense type of the non-volatile storage media of the SSD storage device to a relatively more dense type of the non-volatile storage media of the SSD storage device, or to prioritize and perform migration of data of identified particular least frequently-used (LFU) memory blocks from the relatively less dense type of the non-volatile storage media of the SSD storage device to the relatively more dense type of the non-volatile storage media of the SSD storage device.

11. A method, comprising receiving command packets in a solid-state drive (SSD) storage device of a local information handling system; and performing the following at the SSD storage device level:
  extracting designated attributes from each of the command packets as logical block access (LBA) access activity data;
  temporarily storing the extracted LBA access activity data in a memory of the SSD storage device; and
  then providing the extracted LBA access activity data across a network from the local information handling system to a remote server;
  where the method further comprises:
    analyzing the extracted LBA access activity data provided across the network to the remote server from the local information handling system, and
    controlling at least one of data storage location and/or migration of data within a non-volatile storage media of the SSD storage device of the local information handling system based at least in part on the analyzed extracted LBA access activity data;
  where the method further comprises:
    generating at least one memory management procedure based at least in part on the extracted LBA access activity data provided to the remote server across the network from the local information handling system;
    deploying the at least one memory management procedure across the network to the local information handling system;
    storing the at least one memory management procedure as a computer readable code in a non-transitory tangible controller memory of the SSD storage device of the local information handling system; and
    executing the computer readable code of the stored memory management procedure on at least one programmable integrated circuit of the SSD storage device to control at least one of data storage location or data migration on the non-volatile storage media of the SSD storage device;
  where the generating the at least one memory management procedure based at least in part on the extracted LBA access activity data provided to the remote server across the network from the local information handling system comprises generating the at least one memory management procedure based at least in part on observed historical user access patterns to particular identified blocks of data within the non-volatile storage media of the SSD storage device that are determined from the extracted LBA access activity data; and where the executing the computer readable code of the stored memory management procedure on the at least one programmable integrated circuit of the SSD storage device comprises executing the computer readable code of the stored memory management procedure on the at least one programmable integrated circuit of the SSD storage device to at least one of prioritize and perform storage of data of identified particular most frequently-used (MFU) memory blocks in memory blocks located next to or adjacent to each other in the non-volatile storage media of the SSD storage device, or to prioritize and perform storage of data of identified particular least frequently-used (LFU) memory blocks in memory blocks located apart from each other in the non-volatile storage media of the SSD storage device.

12. A system comprising a local information handling system, the local information handling system comprising:
a host programmable integrated circuit coupled to a network; and
a solid-state drive (SSD) storage device coupled to the host programmable integrated circuit, the SSD storage device of the local information handling system comprising a memory controller, a main storage non-volatile memory that stores user data, and a separate controller memory that stores read/write control logic for the memory controller;
where the SSD storage device receives command packets from the host programmable integrated circuit, and where the SSD storage device comprises at least one programmable integrated circuit programmed to perform the following at the SSD storage device level:
extracting designated attributes from each of the command packets as logical block access (LBA) access activity data that is different from the user data stored on the SSD storage device of the local information handling system,
temporarily storing the extracted LBA access activity data in a non-user data storage area that is a boot partition or overprovisioned area memory of the SSD storage device, and
then providing the extracted LBA access activity data to the host programmable integrated circuit; and
where the host programmable integrated circuit is programmed to provide the extracted LBA access activity data across a network to a remote server from the non-user data storage area of the SSD storage device of the local information handling system.

13. The system of claim 12, where the command packets comprise read and write commands; and where the designated attributes of the command packets comprise at least one of a time-stamp of each command packet, an identity of a type of command designated by each command packet, a logical block address (LBA) designated by each command packet, or a data size information to be read or written in response to the packet.

14. The system of claim 12, where the at least one programmable integrated circuit of the SSD storage device is programmed to compress the extracted LBA access activity data before providing the compressed extracted LBA access activity data to the host programmable integrated circuit; and where the host programmable integrated circuit is programmed to provide the compressed extracted LBA access activity data across the network from the local information handling system to the remote server.

15. The system of claim 12, where no attributes are extracted from the command packets at an operating system (OS) or an application level of the local information handling system; and where the extracted LBA access activity data includes no user personal data.

16. The system of claim 12, further comprising the remote server coupled by the network to the local information handling system; and where at least one programmable integrated circuit of the remote server is programmed to:
analyze the extracted LBA access activity data provided across the network to the remote server from the host programmable integrated circuit of the local information handling system;
generate at least one memory management procedure based at least in part on the extracted LBA access activity data provided to the remote server across the network from the local information handling system; and
deploy the at least one memory management procedure across the network to the local information handling system;
where the at least one programmable integrated circuit of the SSD storage device is programmed to:
store the at least one memory management procedure as a computer readable code in a non-transitory tangible controller memory of the SSD storage device of the local information handling system,
execute the computer readable code of the stored memory management procedure to control at least one of data storage location or data migration on a non-volatile memory of the SSD storage device, and
control at least one of data storage location and/or migration of data within the non-volatile storage media of the SSD storage device based at least in part on the analyzed extracted LBA access activity data.

17. The system of claim 16, where at least one programmable integrated circuit of the remote server is programmed to generate the at least one memory management procedure based at least in part on observed historical user access patterns to particular identified blocks of data within the non-volatile storage media of the SSD storage device that are determined from the extracted LBA access activity data.

18. The system of claim 17, where the at least one programmable integrated circuit of the SSD storage device is programmed to execute the computer readable code of the stored memory management procedure to control data migration on the non-volatile storage media of the SSD storage device between a relatively less dense type of the non-volatile storage media of the SSD storage device and a relatively more dense type of the non-volatile storage media of the SSD storage device.

19. The system of claim 12, where the memory controller of the SSD storage device further comprises a buffer memory; and where the at least one programmable integrated circuit of the SSD storage device is programmed to first store the LBA access activity data in the buffer memory of the memory controller before temporarily storing the extracted LBA access activity data in the non-user data storage area that is the boot partition or overprovisioned area memory of the SSD storage device.

20. A system comprising a local information handling system, the local information handling system comprising:
a host programmable integrated circuit coupled to a network; and a solid-state drive (SSD) storage device coupled to the host programmable integrated circuit;
where the SSD storage device receives command packets from the host programmable integrated circuit, and where the SSD storage device comprises at least one programmable integrated circuit programmed to perform the following at the SSD storage device level:
    extracting designated attributes from each of the command packets as logical block access (LBA) access activity data,
    temporarily storing the extracted LBA access activity data in a memory of the SSD storage device, and
    then providing the extracted LBA access activity data to the host programmable integrated circuit; and
where the host programmable integrated circuit is programmed to provide the extracted LBA access activity data across a network from the local information handling system to a remote server;
where the system further comprises the remote server coupled by the network to the local information handling system; and where at least one programmable integrated circuit of the remote server is programmed to:
    analyze the extracted LBA access activity data provided across the network to the remote server from the host programmable integrated circuit of the local information handling system;
    generate at least one memory management procedure based at least in part on the extracted LBA access activity data provided to the remote server across the network from the local information handling system; and
    deploy the at least one memory management procedure across the network to the local information handling system;
where the at least one programmable integrated circuit of the SSD storage device is programmed to:
    store the at least one memory management procedure as a computer readable code in a non-transitory tangible controller memory of the SSD storage device of the local information handling system,
    execute the computer readable code of the stored memory management procedure to control at least one of data storage location or data migration on a non-volatile memory of the SSD storage device, and
    control at least one of data storage location and/or migration of data within the non-volatile storage media of the SSD storage device based at least in part on the analyzed extracted LBA access activity data;
where at least one programmable integrated circuit of the remote server is programmed to generate the at least one memory management procedure based at least in part on observed historical user access patterns to particular identified blocks of data within the non-volatile storage media of the SSD storage device that are determined from the extracted LBA access activity data; and
where the at least one programmable integrated circuit of the SSD storage device is programmed to execute the computer readable code of the stored memory management procedure to at least one of limit or prevent migration of data of identified particular most frequently-used (MFU) memory blocks from a relatively less dense type of the non-volatile storage media of the SSD storage device to a relatively more dense type of the non-volatile storage media of the SSD storage device, or to prioritize and perform migration of data of identified particular least frequently-used (LFU) memory blocks from the relatively less dense type of the non-volatile storage media of the SSD storage device to the relatively more dense type of the non-volatile storage media of the SSD storage device.

21. A system comprising a local information handling system, the local information handling system comprising:
a host programmable integrated circuit coupled to a network; and
a solid-state drive (SSD) storage device coupled to the host programmable integrated circuit;
where the SSD storage device receives command packets from the host programmable integrated circuit, and where the SSD storage device comprises at least one programmable integrated circuit programmed to perform the following at the SSD storage device level:
    extracting designated attributes from each of the command packets as logical block access (LBA) access activity data,
    temporarily storing the extracted LBA access activity data in a memory of the SSD storage device, and
    then providing the extracted LBA access activity data to the host programmable integrated circuit; and
where the host programmable integrated circuit is programmed to provide the extracted LBA access activity data across a network from the local information handling system to a remote server;
where the system further comprises the remote server coupled by the network to the local information handling system; and where at least one programmable integrated circuit of the remote server is programmed to:
    analyze the extracted LBA access activity data provided across the network to the remote server from the host programmable integrated circuit of the local information handling system;
    generate at least one memory management procedure based at least in part on the extracted LBA access activity data provided to the remote server across the network from the local information handling system; and
    deploy the at least one memory management procedure across the network to the local information handling system;
where the at least one programmable integrated circuit of the SSD storage device is programmed to:
    store the at least one memory management procedure as a computer readable code in a non-transitory tangible controller memory of the SSD storage device of the local information handling system,
    execute the computer readable code of the stored memory management procedure to control at least one of data storage location or data migration on a non-volatile memory of the SSD storage device, and
    control at least one of data storage location and/or migration of data within the non-volatile storage media of the SSD storage device based at least in part on the analyzed extracted LBA access activity data;
where at least one programmable integrated circuit of the remote server is programmed to generate the at least one memory management procedure based at least in part on observed historical user access patterns to particular identified blocks of data within the nonvolatile storage media of the SSD storage device that are determined from the extracted LBA access activity data; and where the at least one programmable integrated circuit of the SSD storage device is programmed to execute the computer readable code of the stored memory management procedure on the at least one programmable integrated circuit of the SSD storage device to at least one of prioritize and perform storage of data of identified particular most frequently-used (MFU) memory blocks in memory blocks located next to or adjacent to each other in the non-volatile storage media of the SSD storage device, or to prioritize and perform storage of data of identified particular least frequently-used (LFU) memory blocks in memory blocks located apart from each other in the non-volatile storage media of the SSD storage device.

* * * * *